(12) United States Patent
Hsiung

(10) Patent No.: US 8,579,336 B2
(45) Date of Patent: Nov. 12, 2013

(54) FASTENING STRUCTURE FOR PORTABLE ELECTRONIC DEVICE

(75) Inventor: Ming-Chun Hsiung, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 373 days.

(21) Appl. No.: 12/953,617

(22) Filed: Nov. 24, 2010

(65) Prior Publication Data

US 2012/0002352 A1 Jan. 5, 2012

(30) Foreign Application Priority Data

Jun. 30, 2010 (CN) .......................... 2010 1 0213730

(51) Int. Cl.
*E05C 19/00* (2006.01)

(52) U.S. Cl.
USPC .................. 292/1; 292/DIG. 64; 361/379.57; 361/679.58

(58) Field of Classification Search
USPC ............ 292/1, DIG. 64; 361/679.01, 679.58, 361/679.57
See application file for complete search history.

(56) References Cited

U.S. PATENT DOCUMENTS

| 3,364,531 | A * | 1/1968 | Moss ............................. 24/637 |
| 6,556,432 | B2 * | 4/2003 | Chen et al. ................ 361/679.33 |
| 8,203,838 | B2 * | 6/2012 | Lin .......................... 361/679.58 |
| 2002/0030968 | A1 * | 3/2002 | Shim ............................. 361/683 |
| 2006/0133023 | A1 * | 6/2006 | Chen et al. ..................... 361/683 |
| 2006/0181841 | A1 * | 8/2006 | Chen et al. ..................... 361/680 |
| 2010/0053887 | A1 * | 3/2010 | Wang ....................... 361/679.58 |

* cited by examiner

*Primary Examiner* — Kristina Fulton
(74) *Attorney, Agent, or Firm* — Altis & Wispro Law Group, Inc.

(57) ABSTRACT

A fastening structure for portable electronic device includes a cover, a main body and a latching member. The cover includes a hook. The main body defines a receiving cavity. The latching member is attached to the main body. The latching member includes a locking portion received in the receiving cavity. The cover is locked on the main body by engagement between the hook and the locking portion.

9 Claims, 7 Drawing Sheets

FASTENING STRUCTURE FOR PORTABLE ELECTRONIC DEVICE

BACKGROUND

1. Technical Field

The exemplary disclosure generally relates to a fastening structure used in a portable electronic device.

2. Description of Related Art

In assembling electronic devices, many subsidiary pieces need to be secured to a main housing of the electronic device. A typical method uses screws to fasten the subsidiary piece to the main housing. However, because most of the subsidiary pieces are thin and usually made of plastic, and due to the fragile nature of plastic, it is difficult to maintain a tight engagement between the subsidiary pieces and the main housing with screws.

Therefore, there is room for improvement within the art.

BRIEF DESCRIPTION OF THE DRAWINGS

Many aspects of the fastening structure can be better understood with reference to the following drawings. The components in the drawings are not necessarily drawn to scale, the emphasis instead being placed upon clearly illustrating the principles of the fastening structure.

DETAILED DESCRIPTION

Figure 1:
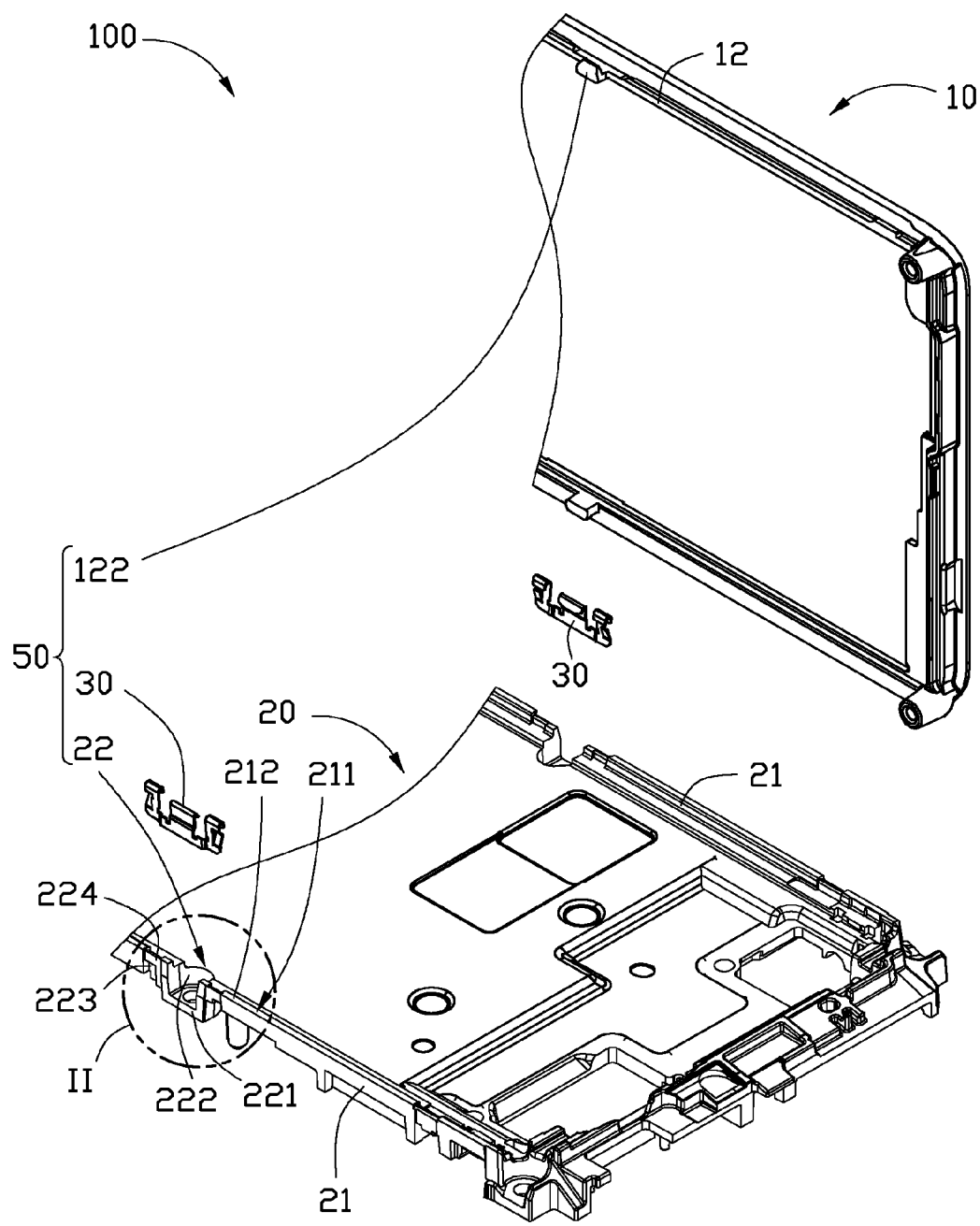
FIG. 1 is an exploded, isometric view of a portable electronic device with a fastening structure, in accordance with an exemplary embodiment.

FIG. 1 shows an exemplary embodiment of a portable electronic device 100 with a fastening structure 50. The portable electronic device 100 includes a cover 10 and a main body 20. The fastening structure 50 includes a plurality of latching members 30, a plurality of latching portions 22 and a plurality of hooks 122, wherein the latching portions 22 are formed on the main body 20 and the hooks 122 are formed on the cover 10.

The cover 10 includes two opposite side edges 12. The hooks 122 are positioned at the two side edges 12.

Figure 2:
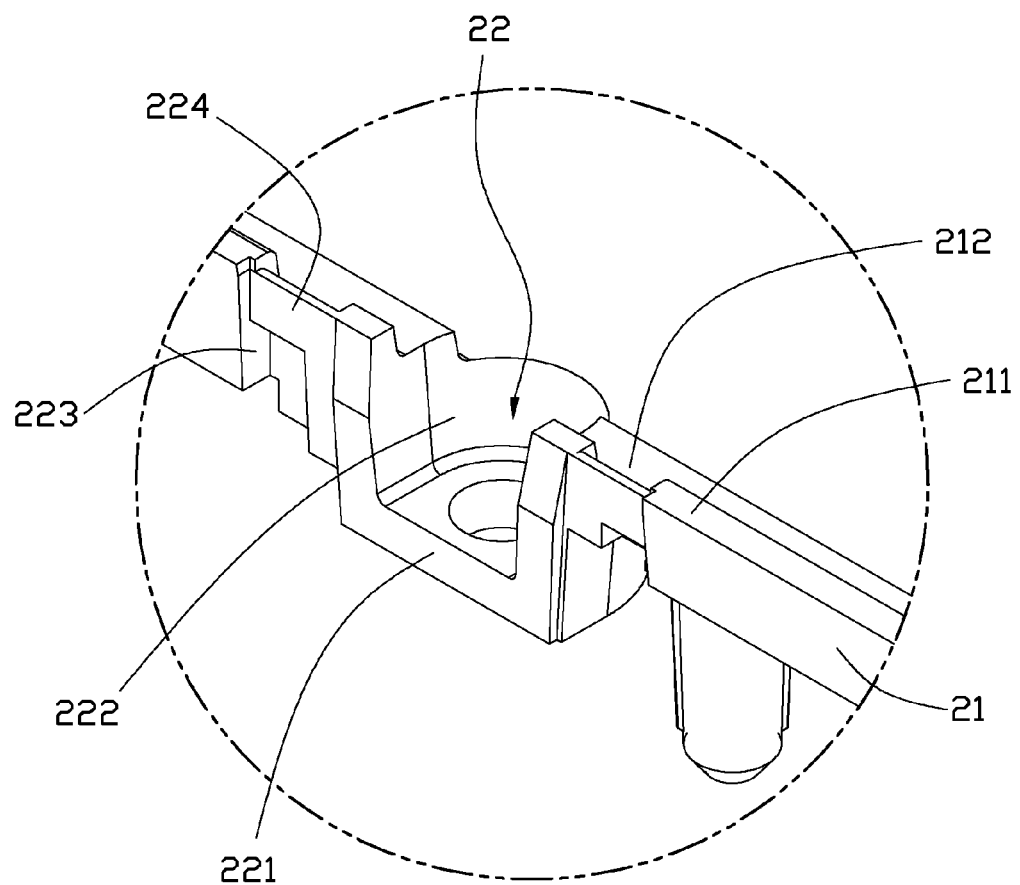
FIG. 2 is an enlarged view of a circled portion II of a main body in FIG. 1.

The main body 20 includes two opposite sidewalls 21. The latching portions 22 are formed at the two sidewalls 21. Each sidewall 21 includes a top surface 211. The top surface 211 is recessed at one side and a flange 212 is formed at another side. Also referring to FIG. 2, each latching portion 22 includes a frame 221 integrally formed with the sidewall 21. The frame 221 defines a receiving cavity 222 through the sidewall 21. The flange 212 is partially cut to form two bars 224 at two sides of each frame 221 correspondingly, and a cutout 223 is defined in the sidewall 21 beneath each bar 224.

Figure 3:
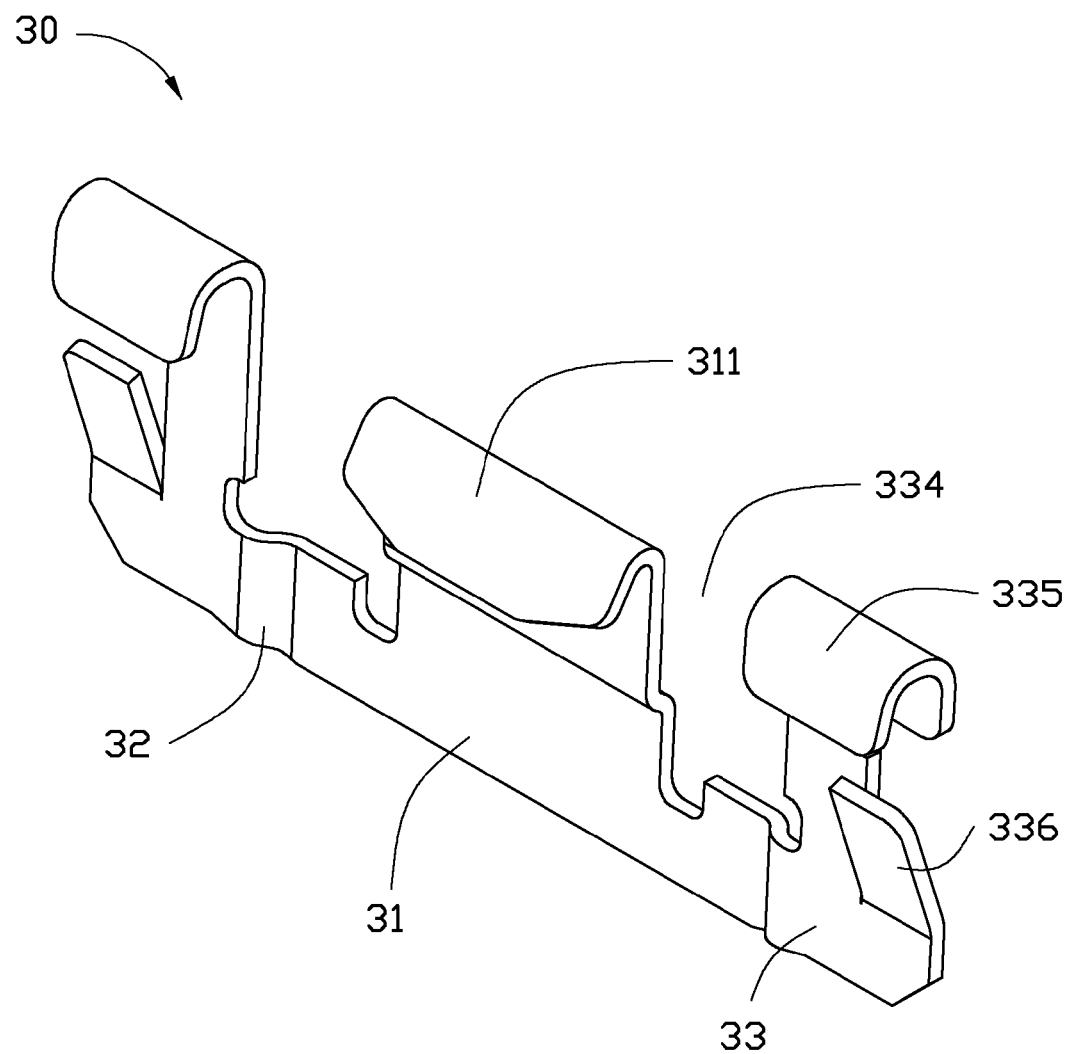
FIG. 3 is an isometric view of a latching member shown in FIG. 1.

Referring to FIG. 3, each latching member 30 includes a middle plate 31 and two extending plates 33 positioned at opposite sides of the middle plate 31. A curved plate portion 32 connects the middle plate 31 and each extending plate 33, wherein a notch 334 is defined between the middle plate 31 and each extending plate 33. The middle plate 31 is bent at an end thereof to form a locking portion 311. Each extending plate 33 is bent at an end thereof to form a fixing portion 335. The locking portion 311 and the fixing portions 335 are hook shaped. A resisting plate 336 extends from each extending plate 33 at angle toward the fixing portion 335. In this exemplary embodiment, each resisting plate 336 is formed by cutting a corresponding extending plate 33 along a broken line beneath the fixing portion 335.

Figure 4:
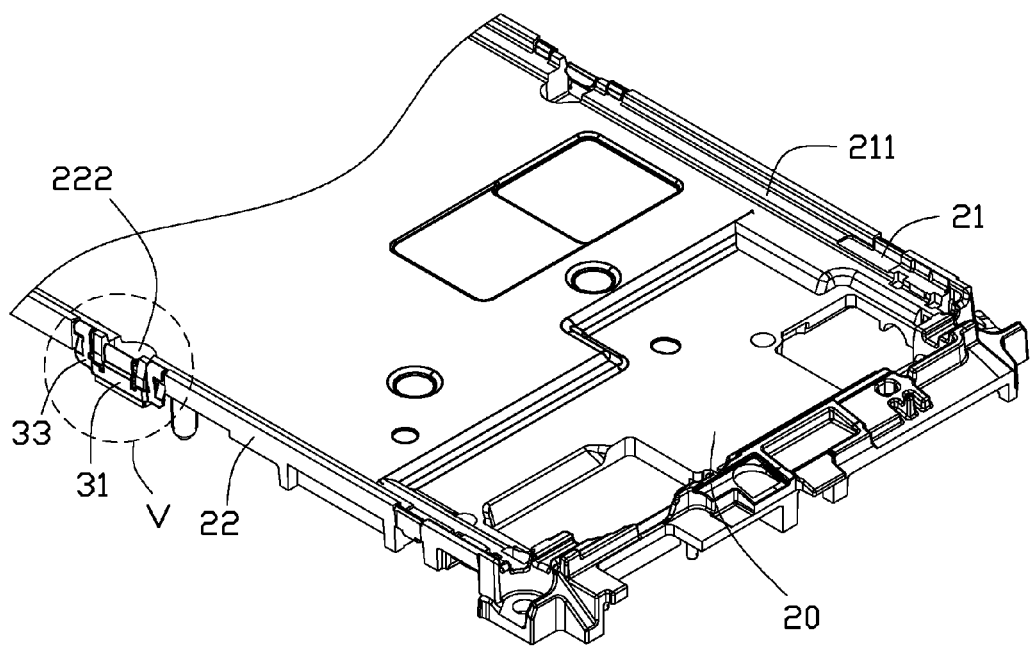
FIG. 4 is an isometric view of the main body shown in FIG. 1, showing the latching members attached to the main body.
Figure 5:
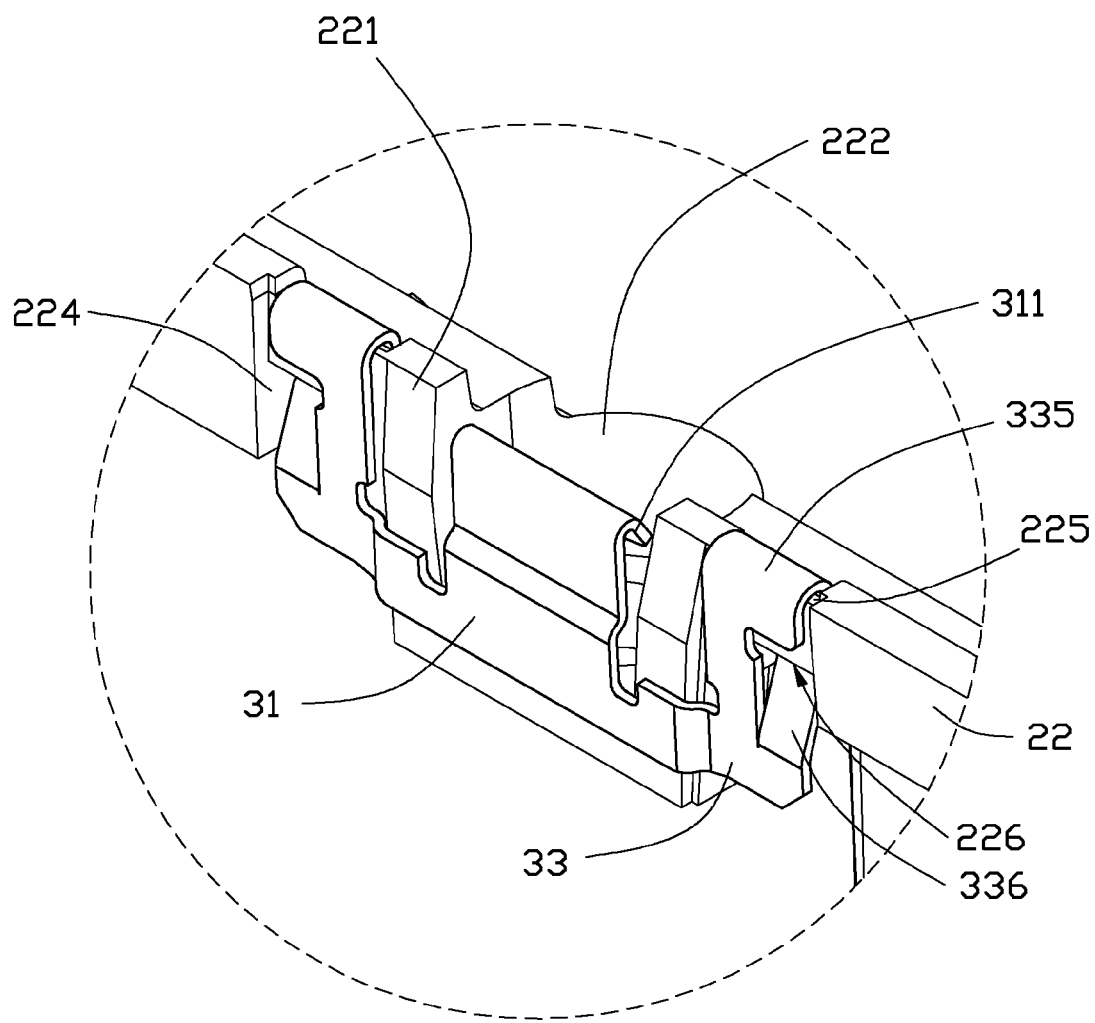
FIG. 5 is an enlarged view of a circled portion V of the main body in FIG. 4.

Referring to FIGS. 4 and 5, to attach the latching members 30 to the latching portions 22 of the main body 20, the fixing portions 335 respectively clasp the bars 224. The middle plate 31 is received in the receiving cavity 222. The resisting plates 336 are pushed into the cutouts 223 and resist the bars 224 to prevent the latching members 30 from separating from the main body 20.

Figure 6:
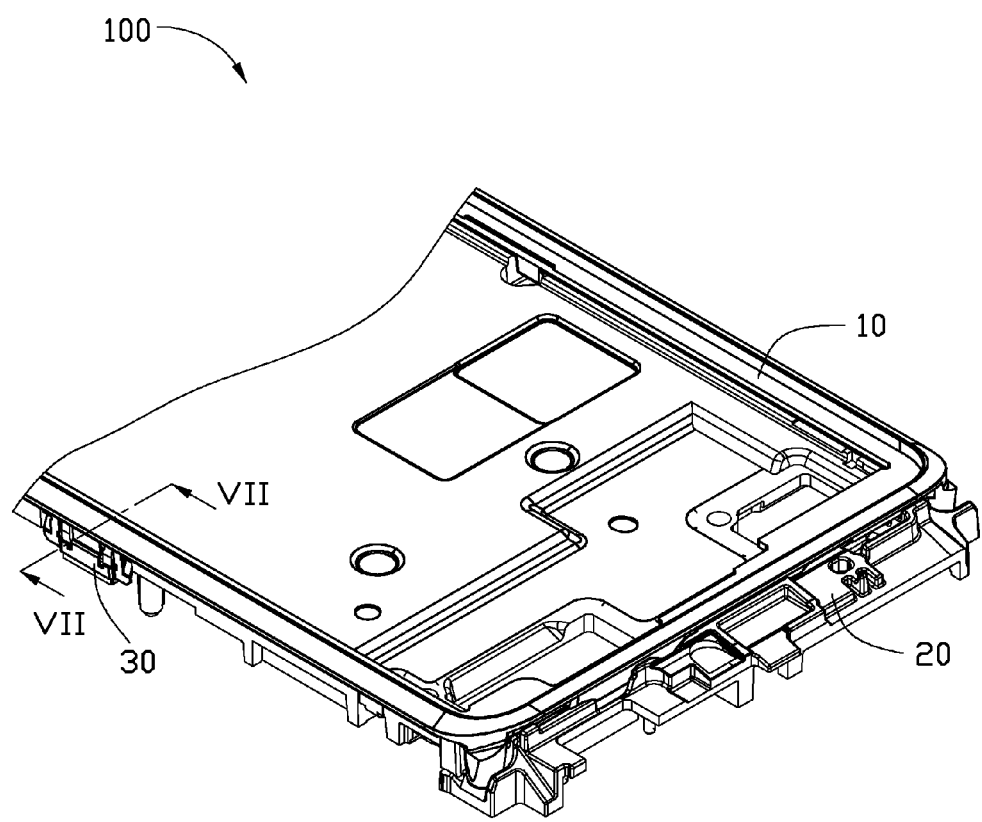
FIG. 6 is an assembled, isometric view of the portable electronic device shown in FIG. 1.
Figure 7:
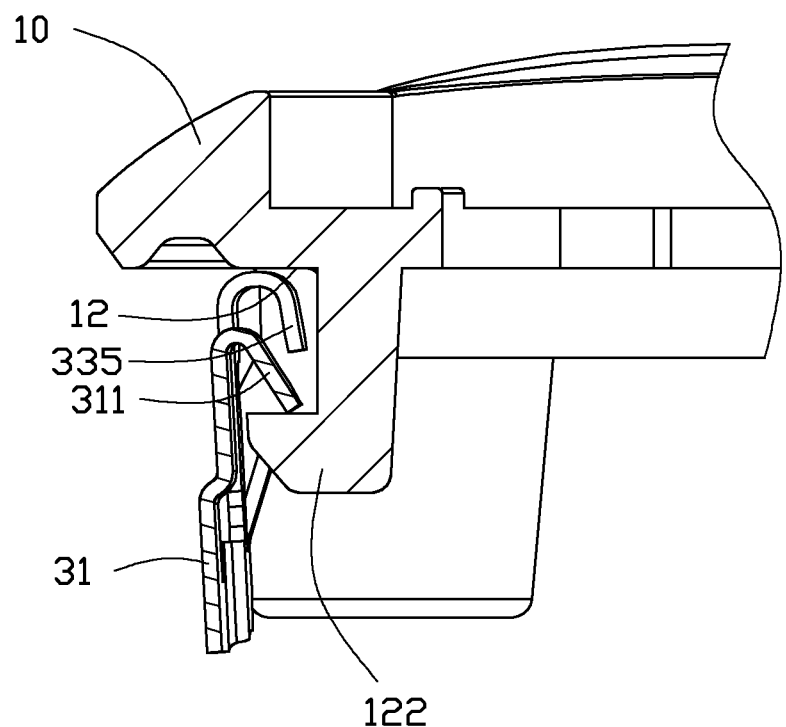
FIG. 7 is a cross section view taken along line VII-VII of FIG. 6.

Referring to FIGS. 6 and 7, to attach the cover 10 to the main body 20, the hooks 122 are respectively inserted into the receiving cavities 222. The hooks 122 slide along the locking portion 311 and the main plates 31 are pushed outward by the hooks 122. When each hook 122 passes its respective locking portion 311, the main plate 31 rebounds to its original shape and the hooks 122 are locked by the locking portions 311.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable electronic device comprising:
a cover including two opposite side edges, and a plurality of hooks positioned at the two side edges;
a main body including two opposite sidewalls, and a plurality of latching portions corresponding to the hooks formed at the two sidewalls, each latching portion defining a receiving cavity; and
a plurality of latching members attached to the latching portions, each latching member including a middle plate, the middle plate being bent at a distal end to form a curved and hollow locking portion, the locking portion received in the receiving cavity
wherein the hooks slide along the locking portions to push outward the middle plate until each hook passes its respective locking portion, the middle plate rebounds to its original shape and the hooks are locked by the locking portions to allow the cover to be locked on the main body.

2. The portable electronic device as claimed in claim 1, wherein each latching portion comprises two bars at two opposite sides of the receiving cavity, and the latching member comprises two fixing portion clasping the two bars.

3. The portable electronic device as claimed in claim 2, wherein a cutout is defined beneath each bar, the latching member comprising a resisting plate beneath each fixing portion, the resisting plate received in the cutout and resisting the bar.

4. The portable electronic device as claimed in claim 3, wherein the latching member includes two extending plates positioned at opposite sides of the middle plate, each resisting plate integrally extends from a side of each extending plate, and each fixing portion is formed at one end of a corresponding extending plate.

5. The portable electronic device as claimed in claim 4, wherein a notch is defined between the middle plate and each extending plate.

6. The portable electronic device as claimed in claim 5, wherein the latching member further comprises a curved plate portion connecting the middle plate and each extending plate.

7. The portable electronic device as claimed in claim 1, wherein each latching portion comprises a frame integrally formed with a sidewall, and the receiving cavity is defined in the frame.

8. The portable electronic device as claimed in claim 7, wherein each sidewall comprises a top surface, and the receiving cavities communicate with the top surfaces.

9. The portable electronic device as claimed in claim 2, wherein the fixing portion is hook shaped, and the bar is latched in the fixing portion.

\* \* \* \* \*